(12) United States Patent
Preiss et al.

(10) Patent No.: US 8,279,798 B2
(45) Date of Patent: Oct. 2, 2012

(54) VIRTUAL HOME NETWORK ARRANGEMENT FOR A SUBSCRIBER MODULE USING IMS

(75) Inventors: Bruno Preiss, Waterloo (CA); Andrew Michael Allen, Mundelein, IL (US); Giyeong Son, Mississauga (CA)

(73) Assignee: Research In Motion Limited, Waterloo (CA)

( * ) Notice: Subject to any disclaimer, the term of this patent is extended or adjusted under 35 U.S.C. 154(b) by 926 days.

(21) Appl. No.: 11/972,202

(22) Filed: Jan. 10, 2008

(65) Prior Publication Data
US 2009/0181671 A1 Jul. 16, 2009

(51) Int. Cl.
*H04W 4/00* (2009.01)
(52) U.S. Cl. ........................ 370/328
(58) Field of Classification Search .............. 370/328
See application file for complete search history.

(56) References Cited

U.S. PATENT DOCUMENTS

| | | | | |
|---|---|---|---|---|
| 7,643,626 | B2 * | 1/2010 | Haase et al. | 379/201.03 |
| 7,701,974 | B2 * | 4/2010 | Mayer et al. | 370/474 |
| 7,738,426 | B2 * | 6/2010 | Smith et al. | 370/331 |
| 7,809,002 | B2 * | 10/2010 | Das et al. | 370/395.42 |
| 7,817,635 | B2 * | 10/2010 | Akhtar et al. | 370/392 |
| 2003/0027595 | A1 * | 2/2003 | Ejzak | 455/560 |
| 2005/0083974 | A1 | 4/2005 | Mayer et al. | |
| 2007/0297419 | A1 * | 12/2007 | Askerup et al. | 370/395.52 |
| 2008/0160995 | A1 * | 7/2008 | Thiebaut et al. | 455/433 |
| 2008/0186921 | A1 * | 8/2008 | Long et al. | 370/331 |
| 2009/0161666 | A1 * | 6/2009 | Ku | 370/356 |

FOREIGN PATENT DOCUMENTS

WO    2007/023286 A    3/2007

OTHER PUBLICATIONS

ETSI 3rd Generation Partnership Project (3GPP). "Digital cellular telecommunications system (Phase 2+); Universal Mobile Telecommunications System (UMTS); Network architecture", 3GPP TS 23.002, version 7.1.0, Release 7, Mar. 2006, p. 1-62.
ETSI 3rd Generation Partnership Project (3GPP). "Digital cellular telecommunications system (Phase 2+); Universal Mobile Telecommunications System (UMTS); Organization of subscriber data", 3GPP TS 23.008, version 7.2.0, Release 7, Jun. 2006, p. 1-73.

(Continued)

*Primary Examiner* — Kenny Lin
(74) *Attorney, Agent, or Firm* — Novak Druce + Quigg LLP (57) ABSTRACT

Systems, methods, and computer-readable media for managing end-to-end security over an IP Multimedia Subsystem (IMS)-enabled network are provided. A first subscriber module accesses an IMS network via an access gateway as a roaming network. The roaming network routes a request for a session from the first subscriber module from its P-CSCF to the I-CSCF of a third-party home network. The third party home network, in turn, routes the request to an S-CSCF implemented at the subscriber's home network, which comprises a second subscriber module. In this way, the session between the two subscriber modules is managed by the subscriber's S-CSCF rather than by a carrier's IMS network, and the subscriber may administer the security relationship without reliance on the carrier or the third party.

20 Claims, 5 Drawing Sheets

OTHER PUBLICATIONS

ETSI 3rd Generation Partnership Project (3GPP). "Digital cellular telecommunications system (Phase 2+); Universal Mobile Telecommunications System (UMTS); Basic Call Handling; Technical realization", 3GPP TS 23.018, version 6.5.0, Release 6, Dec. 2005, p. 1-266.

ETSI 3rd Generation Partnership Project (3GPP). "Digital cellular telecommunications system (Phase 2+); Universal Mobile Telecommunications System (UMTS); IP Multimedia (IM) session handling; IM call model; Stage 2", 3GPP TS 23.218, version 7.2.0, Release 7, Jun. 2006, p. 1-60.

ETSI 3rd Generation Partnership Project (3GPP). Universal Mobile Telecommunications System (UMTS); 3G security; Security architecture, 3GPP TS 33.102, version 7.0.0, Release 7, Dec. 2005, p. 1-64.

3GPP: "3rd Generation Partnership Project; Technical Specification Group Services and System Aspects; IP Multimedia Subsystem (IMS); Stage 2 (Release 8), 3GPP TS 23.228 V8.1.0". Jun. 2007, XP002459198. Retrieved from the Internet Nov. 20, 2007 URL:http//www.3gpp.org/ftp/Specs/html-info/23228.htm.

3GPP: "3rd Generation Partnership Project; Technical Specification Group Services and System Aspects; 3G security; Access security for IP-based services (Release 6); 3GPP TS 33.203 V6.6.0". ETSI Standards, LIS, vol. 3-SA3, No. V6.6.0, Jan. 1, 2005, XP014031148, ISSN: 0000-0001.

Extended European Search Report dated Jun. 12, 2008. In corresponding application No. 08150167.8.

Office Action mailed Jan. 20, 2012. In corresponding Canadian patent application No. 2,649,132.

Extended European Search report mailed Dec. 1, 2011. In corresponding application No. 11177522.7.

3rd Generation Partnership Project; Technical Specification Group Services and System Aspects; 3G security; Access security for IP-based services (Release 6); 3GPP TS 33.203 ETSI Standards, LIS vol. 3-SA3, No. V6.6.0, Jan. 1, 2005, XP014031148 ISSN:0000-0001-p. 11-p.l6; p. 21-p. 30.

3GPP: technical Specification Group Services and System Aspects; IP multimedia subsystem (IMS) Stage 2 (Release 8) 3GPP TS 23.228 V8.1) .0, Internet Citation Jun. 2007 (Jun. 2007), XP002459198, Retrieved from the Internet: URL:http://www.3gpp.org/ftp/specs/html-info/23228.htm (retrieved on Nov. 20, 2007. p. 38 ; p. 42 ; figures 4.0,4.1,4.2.

* cited by examiner

VIRTUAL HOME NETWORK ARRANGEMENT FOR A SUBSCRIBER MODULE USING IMS

BACKGROUND

1. Technical Field

The present invention relates generally to communication between subscriber modules in an IP Multimedia Subsystem (IMS), and in particular to providing end-to-end security between subscriber modules using IMS.

2. Description of the Related Art

IMS generally refers to a reference architecture for the delivery of mobile and fixed IP-based services promulgated by the 3GPP ($3^{rd}$ Generation Partnership Project) consortium. IMS utilizes standard Internet Protocol (IP), and thus may be used by telecommunications carriers and other service providers to offer their subscribers most IP-based services, such as voice over IP (VoIP), videoconferencing, and rich messaging services such as multimedia messaging service (MMS), as well as more widespread messaging services such as instant messaging (IM) and electronic mail, deliverable to subscriber modules that are capable of supporting these services, such as smartphones and other mobile devices. IMS also provides service providers with the opportunity to control and meter individual subscriber services.

Currently, security in an IMS architecture enables service providers to provide secure messaging services to their subscribers by providing a secured communication channel between the service provider's IMS domain and the subscriber module: if a first subscriber module communicates with a second subscriber module through an IMS system, then each subscriber module establishes a security relationship with the service provider's IMS system, and not directly with each other. Thus, if a subscriber using a subscriber-owned mobile device communicates with a subscriber-owned server, each of the mobile device and the server establishes a security relationship with the IMS system. If the subscriber wishes to establish end-to-end security in communication between the subscriber's mobile device and the subscriber's server, then the IMS system must act as a trusted intermediary between the mobile device and server so that the subscriber's server and mobile device can share cryptographic credentials.

BRIEF DESCRIPTION OF THE DRAWINGS

Embodiments of the inventive aspects of this disclosure will be best understood with reference to the following detailed description, when read in conjunction with the accompanying drawings, in which.

DETAILED DESCRIPTION OF THE INVENTION

IMS is generally known as a standard architecture that may be used in providing both mobile and fixed multimedia services to subscribers. There are a number of published specifications for IMS, including, but not limited to "IP Multimedia Subsystem (IMS)", TS23.228, "Access security for IP-based services", TS33.203, and "Network Domain Security (NDS), IP network security", TS33.210, all of which are published by 3GPP, available from www.3gpp.org, and are incorporated herein by reference. Other published specifications will be known to those skilled in the art.

Figure 1:
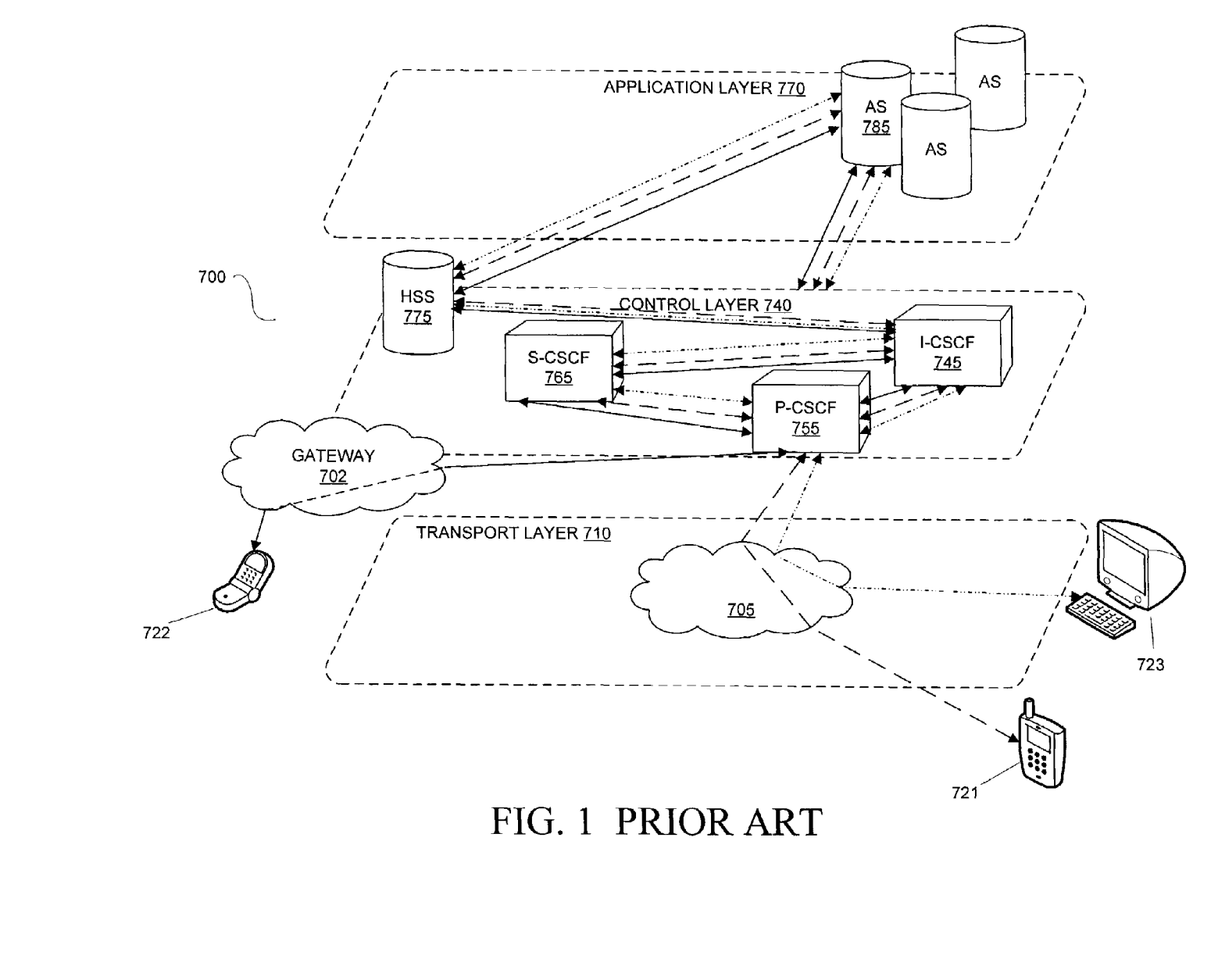
FIG. 1 is a schematic representation of a prior art implementation of IMS infrastructure in a home network.

The general implementation of IMS will be understood by those skilled in the art. Briefly, an IMS comprises a number of different functions that are interconnected by a standardized architecture. With reference to FIG. 1, which depicts a prior art IMS architecture in an exemplary IMS domain 700, the functions may be considered as being distributed among various layers, including a transport layer 710, a control layer 740, and an application layer 770.

The transport layer 710 comprises at least one access network 705 providing subscriber devices, such as devices 721, 722, and 723, access to the IMS. Examples of networks that may be used to access IMS include, but are not limited to, General Packet Radio Service (GPRS), wireless local area networks (WLANs), Asymmetric Digital Subscriber Lines (ADSL), Universal Mobile Telecommunications System (UMTS), and Code Division Multiple Access (CDMA), and other packet-switched networks.

The control layer 740 may comprise at least one gateway 702 to provide circuit-switched systems such as the PSTN with access to the IMS. Subscribers may directly access the IMS using a fixed or wireless link through the access network 705 using an IMS-compatible subscriber device 721, 723, such as, but not restricted to, smartphones, personal digital assistants (PDAs), mobile computers, and other wireless equipment. In the current embodiment of IMS, the subscriber device is capable of using Internet Protocol version 6 (IPv6) for exchanging data with packet-switched networks, and is provided with a Session Initiation Protocol (SIP) user agent for handling IMS sessions. (SIP generally refers to an application-layer protocol for creating, modifying, and terminating sessions in IP-based communications as specified in "SIP: Session Initiation Protocol", Rosenberg et al., RFC 3261, published in June 2002 by the Internet Engineering Task Force, which is incorporated herein by reference.) However, other or alternative technical requirements for the subscriber devices will be appreciated by those skilled in the art.

It will further be appreciated that the subscriber device need not be restricted to a wireless communication device; a subscriber device may also comprise a personal computer, server, or other computing device or system that is operated by, or is under the control of, a subscriber. Alternatively, if the subscriber device is not capable of directly accessing the IMS infrastructure (for example, if the subscriber device is a fixed terminal for a circuit-switched network such as the public switched telephone network or PSTN), then the subscriber device 722 may access the IMS through the gateway 702. A subscriber of an IMS service provider generally refers to an entity operating at least one subscriber device that is registered in the Home Subscriber Server (HSS) for that IMS service provider; that IMS service provider is typically referred to as the subscriber's "home" network. An IMS service provider that is also a provider of wireless messaging services, a wireless network and infrastructure, may also be referred to as a telecommunications "carrier". As is known in the art, a second IMS service provider may allow a subscriber device registered with a different IMS service provider to connect to the second IMS, and through the interconnection of IMS service providers, discussed below, the subscriber may still access the subscriber's home network services while connected to the second service provider's network. In that case, the second IMS network is referred to as a "roaming" or "visited" network. The implementation of roaming services among IMS service providers, including management of location registers, routing information, and the like, will be known to those skilled in the art.

The control layer 740 comprises a number of server functions, generally referred to as call session control functions (CSCFs). In various embodiments, these functions employ the SIP protocol. Specialized call session control functions include the proxy CSCF (P-CSCF) 755, interrogating CSCF (I-CSCF) 745, and the serving CSCF (S-CSCF) 765. When a subscriber device such as mobile terminal 721 contacts the IMS, the contact is initially handled by a P-CSCF 755 assigned to the subscriber device 721. The P-CSCF 755 is assigned to the subscriber device 721 during a registration process, which is an authentication process typically refreshed on a periodic basis; associations between the subscriber device 721 (which may be identified, for example, by its International Mobile Equipment Identity or IMEI) are stored in the home subscriber server (HSS) 775, which is located in the control layer 740 of the IMS domain. (The HSS 775 may also be described as notionally residing between the application layer 770 and the control layer 740.) The HSS 775 may be queried by servers in the control layer 740 as necessary. The P-CSCF 755 authenticates the subscriber device 721 to the IMS network using subscriber data from the HSS 775. The P-CSCF 755 also handles functions such as bandwidth management and tracking services for billing to the subscriber by the IMS service provider administrating the IMS domain 700. Each control packet that is communicated between the subscriber device 721 and the IMS domain 700 passes through the P-CSCF 755.

The I-CSCF 745 is a SIP proxy that provides location services for the subscriber device 721 and is accessible by other servers outside the IMS domain 700. Typically, it is assigned a published IP address so that it can be located by other servers, for example P-CSCFs from other domains, and acts as a point of entry for packets arriving from other domains. In IMS Release 6, the I-CSCF 745 further provides encryption functions to hide the IMS network 700 from external networks; however, this function may be divested to another control function in the control layer (for example, in Release 7 of IMS, this function is provided by an Interconnection Border Control Function, not shown in FIG. 1.) The S-CSCF 765 controls the IMS sessions for the subscriber device 721, and among other functions, performs authentication with the subscriber device 721, and routes messages to the appropriate application server (AS) 785 in the application layer 770; thus, all messages destined for an AS 785 pass through the S-CSCF 765 assigned to the subscriber device 721. Application servers such as AS 785 provide communications services such as call forwarding, conference call and videoconferencing services, presence information, and messaging such as IM, SMS, and the like. The AS 785 providing services to a subscriber module is typically resident in the subscriber's home IMS network, here network 700, although it may be located in an external network operated by a third party. Communication between an externally-situated AS and the subscriber device 721 would then be routed through the subscriber's home I-CSCF 745 to the external network's I-CSCF and from there, to the external AS.

In the prior art, as illustrated in FIG. 1, all three CSCFs are usually located in the single IMS domain 700 to which the subscriber is connected. In some circumstances, the I-CSCF 745 and S-CSCF 765 operative for a subscriber may be located in a different domain, for example, in the situation where the subscriber is roaming and is connected to a network other than the subscriber's home network (i.e., when the subscriber is connected to a "visited" network, not shown in FIG. 1, the I-CSCF and S-CSCF functions may be provided by the subscriber's home network, which is in a different domain).

Message flow is depicted by the arrows in prior art FIG. 1. The functions at the application layer 770, such as the AS 785 and the HSS 775, communicate with the various CSCFs in the control layer 740 using appropriate interfaces that will be known to those skilled in the art, such as the SIP or DIAMETER interface. It will be appreciated that in the prior art architecture of FIG. 1, when one subscriber device such as smartphone 721 attempts to contact a second subscriber device 723 over a secured channel, the two subscriber devices are not in direct communication with each other, as can be seen by the hashed lines depicting message flow between the devices 721, 723 and the IMS architecture, and among the various servers and functions within the IMS network. Any end-to-end security implemented in this system, it will be appreciated, thus depends on the service provider operating the IMS to act as a trusted intermediary between the two subscriber modules; it is the service provider's control layer that comprises the functions for authenticating the subscriber devices 721 to the network. However, it is not always desirable to rely on the IMS service provider to establish end-to-end security between two subscriber modules, particularly where a third-party service provider services the subscriber over the IMS network. The subscriber may wish to exercise control over the end-to-end security relationship among subscriber devices. In the prior art system as exemplified in FIG. 1, if the subscriber wished to do so, then the subscriber would have to control the IMS network. It is therefore desirable to provide a system and method for providing security associations for end-to-end security between two subscriber modules through a third-party service provider that is compatible with IMS.

Figure 2:
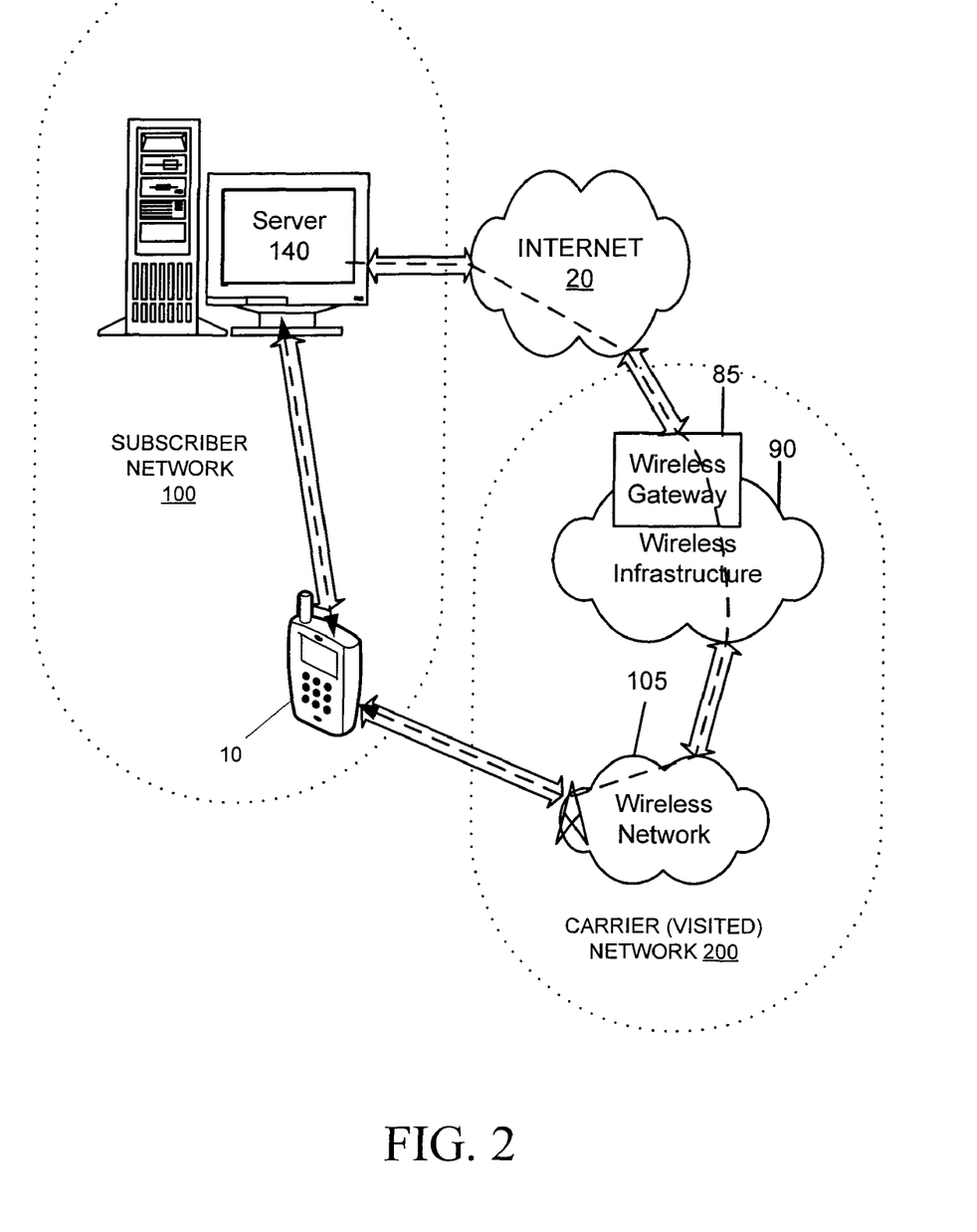
FIG. 2 is a schematic representation of a network implementing end-to-end security between two subscriber modules.

Turning now to FIG. 2, an overview of an exemplary communication system for use with the embodiments described below is shown. One skilled in the art will appreciate that there may be many different topologies, but the system shown in FIG. 2 helps demonstrate the operation of the systems and methods described in the present application. There may be many communications devices connected to the system, that are not shown in the simple overview of FIG. 2.

FIG. 2 shows a communication device comprising a subscriber module 10, here a subscriber wireless mobile device such as a smartphone, a network, here the Internet 20, and a server system 140. FIG. 2 further shows a wireless gateway 85, wireless infrastructure 90, and a wireless network 105. It will be appreciated by those skilled in the art that the devices referred to herein as client devices, personal computers, mobile devices, mobile communication devices, communication devices, computing devices, or data storage devices may comprise devices that may be used directly or indirectly with an IMS network, and whose main function is directed to data or voice communication over a network and data storage, but may also be provided with personal or productivity applications, or devices whose main function is directed to computing or executing productivity applications, but are also adapted to enable a user to communicate over a network. Such devices include, but are not limited to, laptop and notebook computers, PDAs, smartphones, and the like. The subscriber device may be capable of communicating over a wireless network, as set out in further detail below. The subscriber devices referred to herein comprise subscriber modules 10, which may comprise software, hardware, or combinations thereof adapted to carry out the functions of the subscriber devices described herein.

The wireless gateway 85 and infrastructure 90 provide a link between the Internet 20 and wireless network 105. The wireless infrastructure 90 determines the most likely network for locating a given user and tracks the user as they roam between countries or networks. Messages and other data may be delivered to the subscriber device and module 10 via wireless transmission, typically at a radio frequency (RF), from a base station in the wireless network 105 to the subscriber device and module 10. The particular network 105 may be any wireless network over which messages may be exchanged with a mobile communication device. The subscriber device and module 10 may also receive data by other means, for example through a direct connection to a port provided on the device.

Typically, the subscriber device is registered on a wireless service provider's (also referenced herein as "carrier's") network 200. The carrier's network 200 may comprise an IMS network (illustrated in FIGS. 3 and 4); the wireless network 105, infrastructure 90 and gateway 85 may operate as the access network to the IMS.

The subscriber server system module 140 may be implemented, for example, on one or more networked computers within the firewall of a corporation, or on a computer within an ISP (Internet Service Provider) or ASP (Application Service Provider) system or the like. The subscriber module 140 may act as the application, network access, and/or file server for one or more communication devices. In one embodiment, the subscriber module 140 may provide messaging functions. The subscriber module 10 or subscriber device, if the subscriber device is configured for receiving and possibly sending messages such as e-mail, may be associated with an account on the subscriber module 140. If the subscriber module 140 acts as a message server, the module 140 may support either a so-called "pull" or "push" message access scheme, wherein the subscriber module 10 or device must request that stored messages be forwarded by the message server to the subscriber module 10 or device ("pull"), or the subscriber module 140 may be provided with means for automatically redirecting messages addressed to the user of the subscriber module 10 or device as they are received ("push"). This redirection of messages may be carried out via a server function in a third-party provided network, described with reference to FIGS. 3 and 4. Other software products and other components that are often used in conjunction with the functions of the subscriber module 140 described herein will be known to those skilled in the art.

The association between the two subscriber modules, the subscriber module 10 and the subscriber module 140, is illustrated as subscriber network 100 in FIG. 2. In accordance with various embodiments, the subscriber module 10 is capable of being connected to the subscriber module 140, for example, through a direct connection to a port provided on the device; by connecting the subscriber module 10 with the module 140, the module 140 is able to direct packets of data, whether messages or other data such as cryptographic credentials, application data, calendar data, address book data, and the like, to the subscriber module 10 over the direct connection. In this way, the module 140 and subscriber module 10 can establish a trusted relationship including a security association or relationship, using means that are also known in the art; for example, the module 140 may establish a security relationship with the subscriber module 10 by provisioning the subscriber module 10 when the subscriber module 10 is connected with the module 140 with information relating to an encryption algorithm and cryptographic credentials to be employed in future communications between the module 140 and the module 10, including communications over an indirect connection, for example a connection over an IMS network, as described below.

Figure 3:
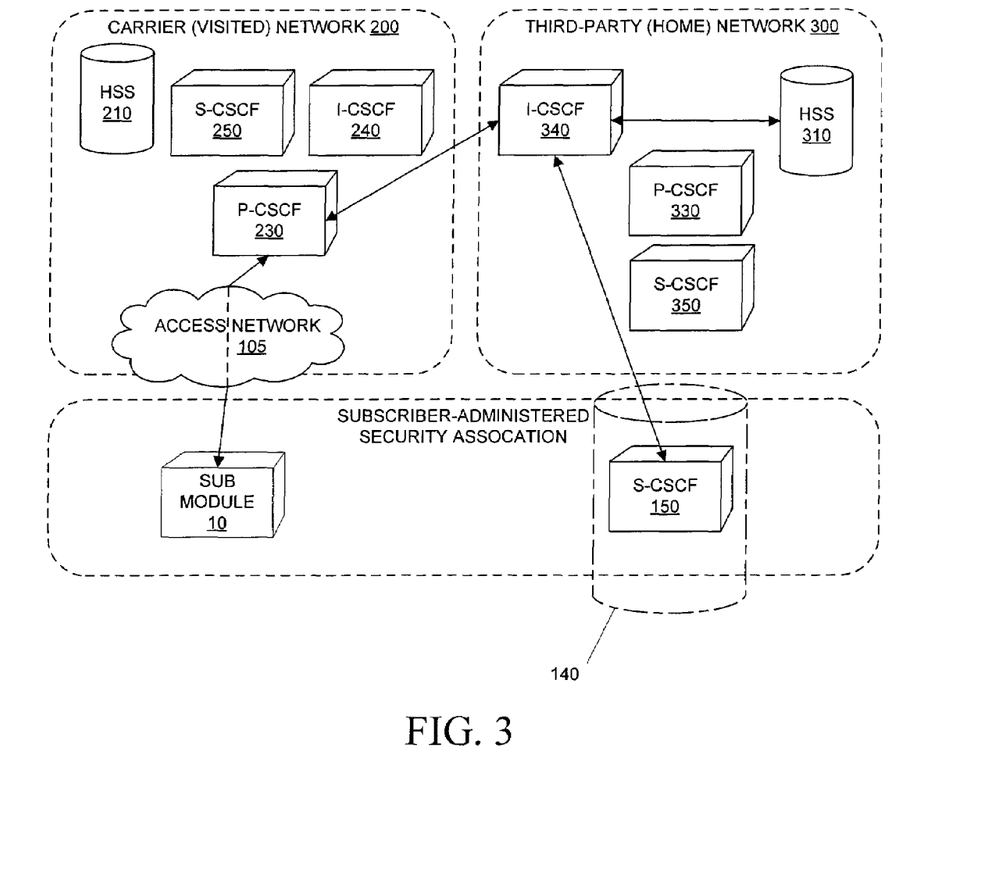
FIG. 3 is a schematic representation of message flow in an implementation of end-to-end security between two subscriber modules over IMS.

The subscriber may utilize a carrier-supplied IMS network, while controlling the end-to-end security between the subscriber module 10 connected to a carrier network and a subscriber module 140 such as a subscriber server. As shown in FIG. 3, the subscriber operates the subscriber module 10, which may be a mobile device or a personal computer, for example, as well as the subscriber module 140. As described above, the subscriber module 10 and the subscriber module 140 operate in a security association or relationship, which may be subscriber-administered; "subscriber-administered" may include administration by the operator of the subscriber module 10 or the operator of the subscriber server system module 140; these operators may be the same person or entity, or they may be affiliated, for example with the same organization. In the manner of the prior art discussed above, a carrier 200 operates a carrier IMS-enabled network 200, accessible by an access network 105. The carrier network 200 comprises a HSS 210, an I-CSCF 240, a P-CSCF 230, and an S-CSCF 250, each of which functions generally as described in relation to the prior art. However, rather than rely on the operation of the HSS 210 and the S-CSCF 250 implemented at the carrier network, instead, the carrier network 200 is configured to operate as a roaming or "visited" network. The subscriber module 10 connects via the access network 105 to the P-CSCF 230 of the carrier network and registers with the carrier network 200 as a roaming subscriber module, designating a third party network as its "home" network.

In this embodiment, the subscriber module 140, described above, is further provided with call session control functionality, in particular an S-CSCF 150, within a domain. The S-CSCF 150 is accessible outside the subscriber-owned network, for example via the Internet 20 (shown in FIG. 2).

A third-party I-CSCF 340 is provided in a further domain. In the manner of prior art IMS systems, the third-party I-CSCF 340 operates as a point of entry for packets arriving from other domains destined for subscriber modules whose "home" network is associated with the third-party I-CSCF 340. The IP address of the I-CSCF 340 may be published so that the carrier network 200 may easily look up and locate the I-CSCF 340. Thus, when the subscriber module 10 connects to the IMS system of the carrier (visited) network 200, and for example requests an IMS session with an application server function resident on the subscriber module 140, the carrier network, using techniques known in the art, identifies the subscriber module 10 as a roaming device and routes messages to and from the subscriber module 10 through the carrier's P-CSCF 230 to the third party (home) network's I-CSCF 340.

The third-party network 300 is further provided with an HSS 310 in the same domain as the I-CSCF 340, which maintains records for the subscriber module 10. While the third-party network 300 may also be provided with other servers and functions, such as the P-CSCF 330 and the S-CSCF 350, these elements are not required for the implementation of various embodiments. Upon receiving a request for a session from the P-CSCF 230 of the carrier (visited) network 200, the third-party (home) network I-CSCF 340 queries its HSS 310 for a subscriber profile associated with the "roaming" subscriber module 10. The HSS 310 comprises a record associating the subscriber module 10 with the subscriber module 140, and in particular the S-CSCF 150. This information is returned to the I-CSCF 340, which routes the request to the S-CSCF 150 in the subscriber network. Thus, a request for a session from the subscriber module 10 is delivered to the subscriber module 140. Because the S-CSCF 150 is authoritative for managing the IMS sessions between the subscriber module 140 and the subscriber module 10 and the S-CSCF 150 is operated by the subscriber, the subscriber is provided with end-to-end control over the handling of the IMS session between the two subscriber modules 10 and 140 without having to provide a complete, subscriber-controlled IMS network. The operation of the IMS service, with respect to the subscriber modules 10 and 140, is decentralized; however, the operation of the network is still transparent to and compatible with the carrier network 200.

Figure 4:
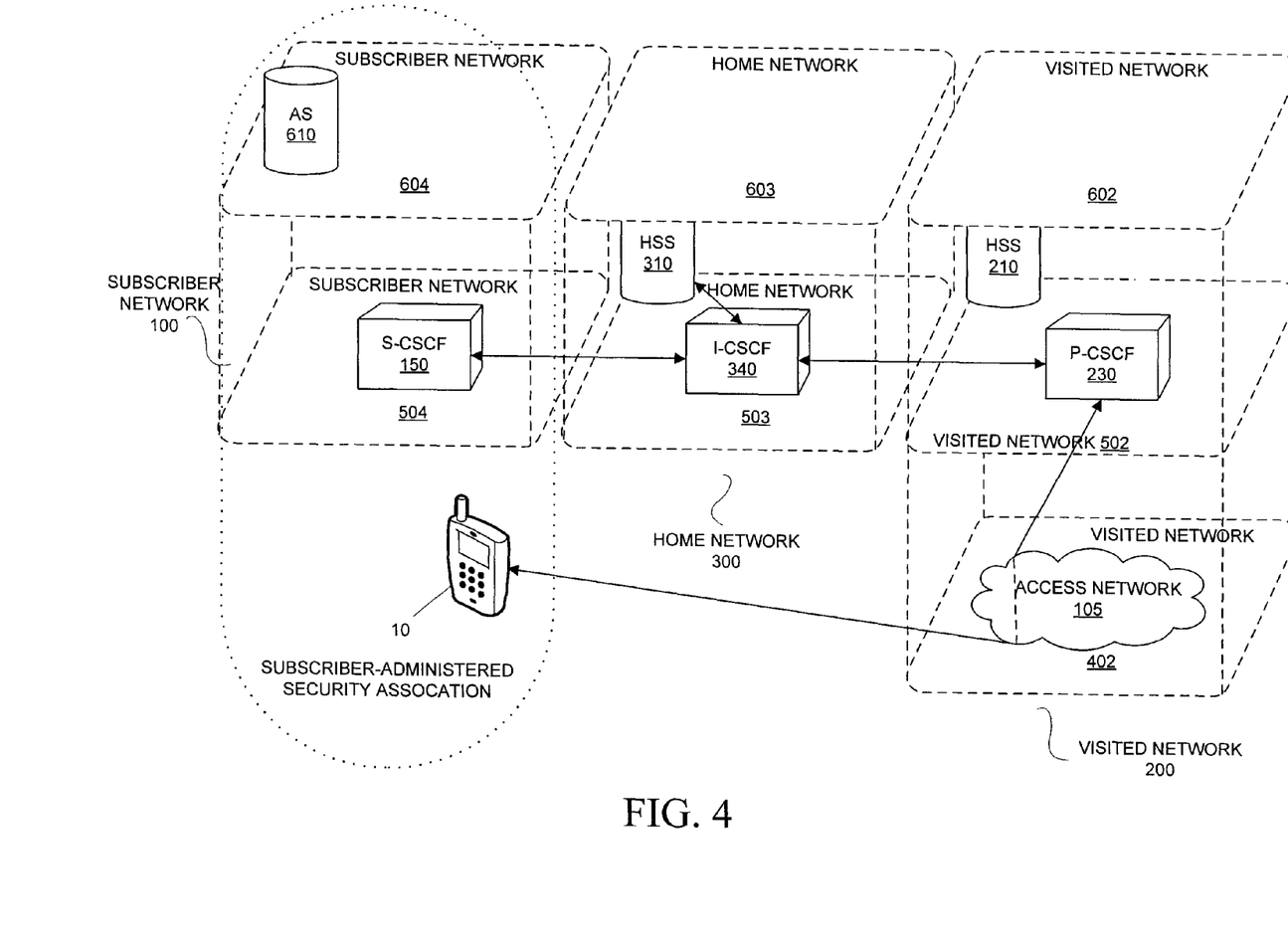
FIG. 4 is a further schematic of the allocation of control functions in the embodiment of FIG. 3.

The decentralization of the CSCF functions is more clearly set out in FIG. 4. The CSCF functions for the subscriber modules 10 and 140 are now distributed among the carrier's (visited network) IMS control layer 502, the third party (home) network control layer 503, and the subscriber's control layer 504. The authoritative HSS 310 for the subscriber module 10 is provided at the home network's application layer 503. The S-CSCF 150 functions are provided by the subscriber network 100 at the subscriber network's control layer 504; the application server 610 is also provided by the subscriber network 100 at the application layer 604. Thus, a message or packet from the subscriber module 10 may enter the visited network's access network 105, either directly or through a gateway (not shown) in the transport layer 402; from the access network 105, packets are then received by the P-CSCF 230 at the visited network. As the subscriber module 10 is identified as a roaming device, its "home" I-CSCF 340 is identified and the packets are routed to the I-CSCF 340, which locates the subscriber's network 100 and routes the packets to the S-CSCF 150. The S-CSCF 150 thus manages the session with the application server 610, resident at the subscriber network's application layer 604. The application server 610 may comprise a message server or other function provided by the subscriber module 140.

It will be appreciated that because authentication of the subscriber module 10 is handled by the S-CSCF 150 thus decentralized from both the carrier (visited) network 200 and the third-party (home) network 300, and is comprised in the subscriber network 100, the cryptographic methods for securing the messaging between the subscriber's mobile and server modules are completely under subscriber control. The security relationship between the subscriber modules 10, 140 may be managed, for example, via the subscriber server 140. The third party network 300 thus effectively provides a virtual home network for the subscriber modules 10, 140, although the third party network 300 itself does not comprise the other elements of an IMS-enabled network besides the HSS 310 and the I-CSCF 340.

There is thus provided a communications system enabled for use with an IP Multimedia Subsystem (IMS)-enabled network to enable IMS communications between a first subscriber module and a second subscriber module, comprising a first domain comprising a first home subscriber server (HSS) and a first interrogating call session control function (I-CSCF) in communication with the IMS-enabled network; and a second domain comprising the first subscriber module and a first serving call session control function (S-CSCF) in communication with the first I-CSCF; wherein the first HSS and the first I-CSCF operate as a virtual home network for a second subscriber module connected to the IMS-enabled network such that IMS packets received by the IMS-enabled network from the second subscriber module are routed to the first subscriber module. In one aspect, the second domain comprises an application server in communication with the first S-CSCF; in another, either one of the S-CSCF and the application server, or both, is implemented on the first subscriber module. The IMS-enabled network may comprise a control layer comprising a proxy call session control function (P-CSCF), and an access network providing a subscriber module access to the P-CSCF, wherein the P-CSCF is configured to route packets received from the second subscriber module via the access network to the first I-CSCF. The P-CSCF is configured to route packets received from the second subscriber module to the first I-CSCF over a packet-switched network, and the packet-switched network may comprise an IP network.

In a further aspect, the IMS-enabled network operates as a roaming network for the second subscriber module when the second subscriber module is connected to the IMS-enabled network, such that the IMS-enabled network routes IMS packets received from the second subscriber module through the P-CSCF to the first I-CSCF. Further, the first subscriber module and the second subscriber module may be configured to be in a security relationship, and the relationship may comprise encryption and cryptographic credentials for securing communications between the first subscriber module and second subscriber module.

There is also provided a communication method between a first subscriber module and a second subscriber module over an IP Multimedia Subsystem (IMS)-enabled network, the method comprising providing a subscriber network with a serving call session control function (S-CSCF) and the first subscriber module; providing a home IMS-compatible network with a home interrogating call session control function (I-CSCF) and a home subscriber server (HSS), wherein the home I-CSCF is configured to route packets received from the second subscriber module to the subscriber network; receiving a packet at the home I-CSCF from an IMS-enabled network to which the first subscriber module is connected as a roaming subscriber module; and routing the packet to the S-CSCF for receipt by the first subscriber module. In a further aspect, routing the packet to the S-CSCF comprises determining an identity of the first subscriber module, and querying the HSS for a destination address corresponding to the identity of the first subscriber module, such that the packet is routed to the destination address. The method may further comprise tethering the first subscriber module to the second subscriber module in a security relationship, or managing the security relationship at the first subscriber module.

Still a further method provided is a method for communicating between a first subscriber module and a second subscriber module over an IP Multimedia Subsystem (IMS), the method comprising, by the first subscriber module, requesting through a visited IMS-enabled network an IMS session with the second subscriber module in a subscriber network, the second subscriber module comprising a serving call session control function (S-CSCF), the first and second subscriber modules being operated in a security association controlled by a subscriber; and receiving a packet from the second subscriber module in response to the request for the IMS session once the S-CSCF authenticates the request. In a further aspect, in this further method requesting the IMS session comprises receiving, at a proxy call session control function (P-CSCF) of the IMS-enabled network, the request for the IMS session; and transmitting, by the P-CSCF, the request for the IMS session to an interrogating call session control function (I-CSCF) at a home network, the home network comprising a home subscriber server (HSS) comprising a record associating the first subscriber module with the second subscriber module. This method may further comprise the I-CSCF receiving a profile associated with the first subscriber module from the HSS, the profile comprising an association with the second subscriber module. In a further aspect, receiving the packet from the second subscriber module in response to the request for the IMS session once the S-CSCF authenticates the request comprises receiving, at the S-CSCF, the request for the IMS session; and authenticating the request for the IMS session. In still a further aspect, authenticating the request for the IMS session comprises configuring a cryptographic method for securing communications between the first subscriber module and the second subscriber module.

There is also provided a computer-readable medium comprising code executable by one or more computers in a system providing communication between a first subscriber module and a second subscriber module over an IP Multimedia Subsystem (IMS)-enabled network, for causing the system to provide a subscriber network with a serving call session control function (S-CSCF) and the first subscriber module; provide a home IMS-compatible network with a home interrogating call session control function (I-CSCF) and a home subscriber server (HSS), wherein the home I-CSCF is configured to route packets received from the second subscriber module to the subscriber network; receive a packet at the home I-CSCF from an IMS-enabled network to which the first subscriber module is connected as a roaming subscriber module; and route the packet to the S-CSCF for receipt by the first subscriber module.

There is also provided a system in an IMS-enabled network for enabling IMS communications between a first subscriber module and a second subscriber module, the second subscriber module comprising a serving call session control function (S-CSCF), the system comprising a home subscriber server (HSS); and an interrogating call session control function (I-CSCF) in communication with the IMS-enabled network; wherein the HSS and the I-CSCF operate as a virtual home network for the first subscriber module when it is connected to the IMS-enabled network, such that IMS packets received by the IMS-enabled network from the first subscriber module are routed to the second subscriber module. In a further aspect, the HSS comprises a record associating the first subscriber module with the second subscriber module. In another aspect, the I-CSCF is configured to route requests for IMS sessions from the first subscriber module to the S-CSCF at the second subscriber module. The system may further comprise the second subscriber module, which may comprise an application server. In still a further aspect, the I-CSCF is configured to receive requests for IMS sessions from the first subscriber module through a proxy call session control function (P-CSCF) at a roaming network to which the first subscriber module is connected.

Figure 5:
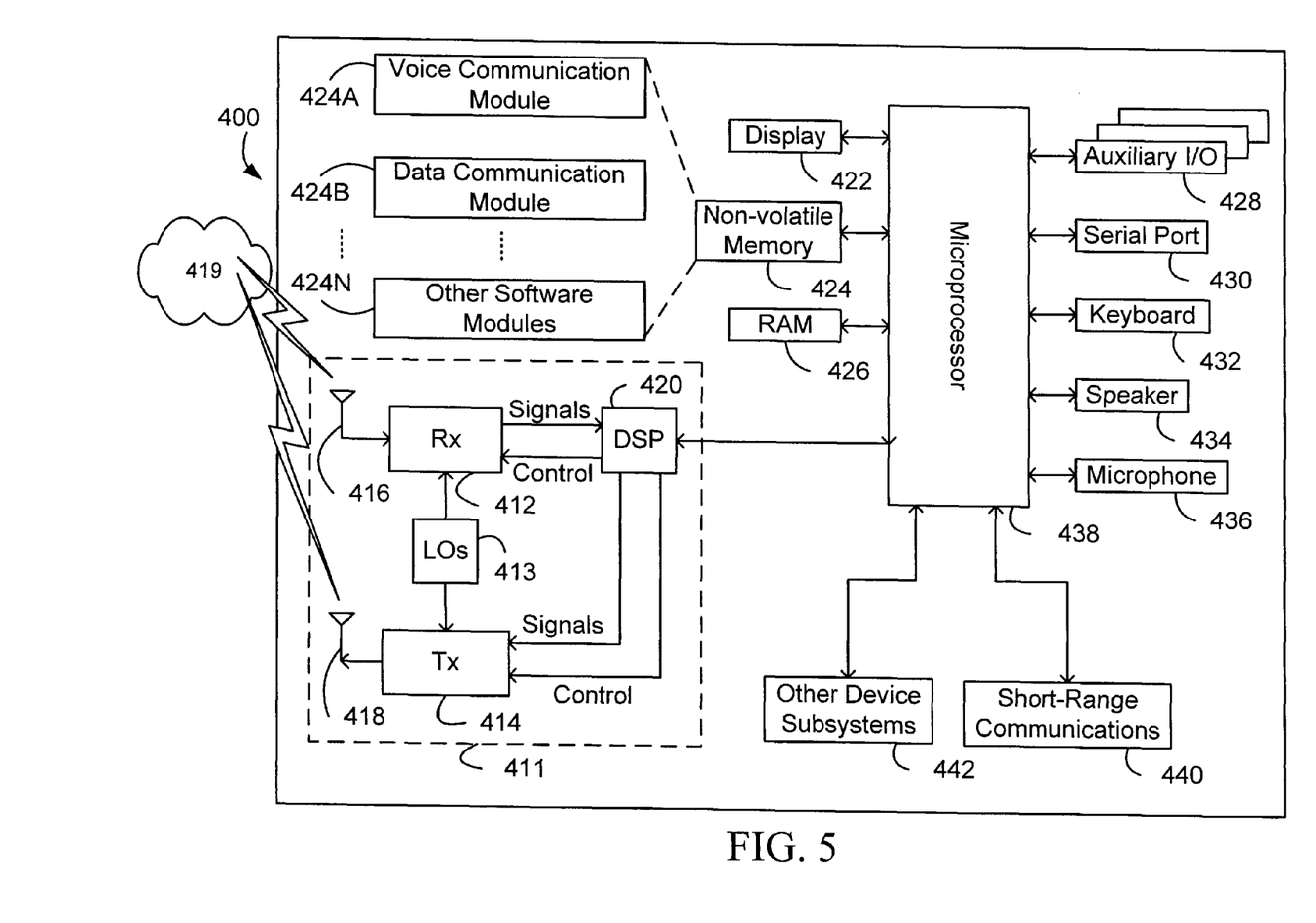
FIG. 5 is a schematic representation of an exemplary subscriber module for use in the network of FIG. 2.

As another example, the systems and methods disclosed herein may be used with many different computers and devices, such as a further wireless mobile device 400 shown in FIG. 5. With reference to FIG. 5, the mobile device 400 may comprise a dual-mode mobile device and includes a transceiver 411, a microprocessor 438, a display 422, non-volatile memory 424, random access memory (RAM) 426, one or more auxiliary input/output (I/O) devices 428 including, but not limited to, a trackball or touchpad, a serial port 430, a keyboard 432, a speaker 434, a microphone 436, a short-range wireless communications sub-system 440, and other device sub-systems 442.

The mobile device 400 may comprise a two-way communication device having voice and data communication capabilities. Thus, for example, the mobile device 400 may communicate over a voice network, such as any of the analog or digital cellular networks, and may also communicate over a data network. These voice and data networks 419 may be separate communication networks using separate infrastructure, such as base stations, network controllers, etc., or they may be integrated into a single wireless network.

The transceiver 411 includes a receiver 412, a transmitter 414, antennas 416 and 418, one or more local oscillators 413, and a digital signal processor (DSP) 420. The antennas 416 and 418 may be antenna elements of a multiple-element antenna, and may be embedded antennas. However, the systems and methods described herein are in no way restricted to a particular type of antenna, or even to wireless communication devices. In one embodiment, the DSP 420 is used to send and receive signals to and from the antennas 416 and 418, and also provides control information to the receiver 412 and the transmitter 414. If the voice and data communications occur at a single frequency, or closely-spaced sets of frequencies, then a single local oscillator 413 may be used in conjunction with the receiver 412 and the transmitter 414. Alternatively, if different frequencies are utilized for voice communications versus data communications for example, then a plurality of local oscillators 413 can be used to generate a plurality of frequencies corresponding to the voice and data networks 419. Information, which includes both voice and data information, is communicated to and from the transceiver 411 via a link between the DSP 420 and the microprocessor 438.

The detailed design of the transceiver 411, such as frequency band, component selection, power level, etc., will be dependent upon the voice and data networks 419 in which the mobile device 400 is intended to operate. The voice and data networks 419 may be separate voice networks and separate data networks, or may comprise integrated voice and data networks. It will be appreciated by those skilled in the art that these embodiments may be implemented on a variety of voice and data networks 419, including, but not limited to, 2G, 2.5G, 3G, 4G, and other voice and data networks, such as GSM, CDMA2000, GPRS, EDGE, W-CDMA (UMTS), FOMA, EV-DO, TD-SCDMA, HSPA, HSOPA, and the like.

Depending upon the type of network or networks 419, the access requirements for the mobile device 400 may also vary. For example, in GPRS data networks, network access is associated with a subscriber or user of a mobile device. A GPRS device typically uses a subscriber identity module ("SIM"), which is used in order to operate a mobile device on a GPRS network. Local or non-network communication functions (if any) may be operable, without the SIM device, but a mobile device may be unable to carry out any functions involving communications over the voice and data networks 419, other than any legally required operations, such as '911' emergency calling.

After any required network registration or activation procedures have been completed, the mobile device 400 may then send and receive communication signals, including both voice and data signals, over the voice and networks 419. Signals received by the antenna 416 from the voice and data networks 419 are routed to the receiver 412, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 420. In a similar manner, signals to be transmitted to the voice and data networks 419 are processed, including modulation and encoding, for example, by the DSP 420 and are then provided to the transmitter 414 for digital to analog conversion, frequency up conversion, filtering, amplification and transmission to the voice and data networks 419 via the antenna 418.

In addition to processing the communication signals, the DSP 420 also provides for transceiver control. For example, the gain levels applied to communication signals in the receiver 412 and the transmitter 414 may be adaptively controlled through automatic gain control algorithms implemented in the DSP 420. Other transceiver control algorithms could also be implemented in the DSP 420 in order to provide more sophisticated control of the transceiver 411.

The microprocessor 438 manages and controls the overall operation of the mobile device 400. Many types of microprocessors or microcontrollers could be used here, or, alternatively, a single DSP 420 could be used to carry out the functions of the microprocessor 438. Low-level communication functions, including at least data and voice communications, are performed through the DSP 420 in the transceiver 411. Other, high-level communication applications, such as a voice communication application 424A, and a data communication application 424B may be stored in the non-volatile memory 424 for execution by the microprocessor 438. For example, the voice communication module 424A may provide a high-level user interface operable to transmit and receive voice calls between the mobile device 400 and a plurality of other voice or dual-mode devices via the voice and data networks 419. Similarly, the data communication module 424B may provide a high-level user interface operable for sending and receiving data, such as e-mail messages, files, organizer information, short text messages, etc., between the mobile device 400 and a plurality of other data devices via the voice and data networks 419. The microprocessor 438 also interacts with other device subsystems, such as the display 422, the RAM 426, the auxiliary input/output (I/O) subsystems 428, the serial port 430, the keyboard 432, the speaker 434, the microphone 436, the short-range communications subsystem 440 and any other device subsystems generally designated as 442.

Some of the subsystems shown in FIG. 5 perform communication-related functions, whereas other subsystems may provide "resident" or on-device functions. Notably, some subsystems, such as the keyboard 432 and the display 422 may be used for both communication-related functions, such as entering a text message for transmission over a data communication network, and device-resident functions such as a calculator or task list or other PDA type functions.

Operating system software used by the microprocessor 438 may be stored in a persistent store such as non-volatile memory 424. The non-volatile memory 424 may be implemented, for example, as a Flash memory component, or as battery backed-up RAM. In addition to the operating system, which controls low-level functions of the mobile device 400, the non-volatile memory 424 includes a plurality of software modules 424A-424N that can be executed by the microprocessor 438 (and/or the DSP 420), including a voice communication module 424A, a data communication module 424B, and a plurality of other operational modules 424N for carrying out a plurality of other functions. These modules are executed by the microprocessor 438 and provide a high-level interface between a user and the mobile device 400. This interface typically includes a graphical component provided through the display 422, and an input/output component provided through the auxiliary I/O 428, keyboard 432, speaker 434, and microphone 436. The operating system, specific device applications or modules, or parts thereof, may be temporarily loaded into a volatile store, such as RAM 426 for faster operation. Moreover, received communication signals may also be temporarily stored to RAM 426, before permanently writing them to a file system located in a persistent store such as the Flash memory 424.

The non-volatile memory 424 may provide a file system to facilitate storage of PIM (Personal Information Manager) data items on the device. The PIM application may include the ability to send and receive data items, either by itself, or in conjunction with the voice and data communication modules 424A, 424B, via the voice and data networks 419. The PIM data items may be seamlessly integrated, synchronized and updated, via the voice and data networks 419, with a corresponding set of data items stored or associated with a host computer system, thereby creating a mirrored system for data items associated with a particular user.

Context objects representing at least partially decoded data items, as well as fully decoded data items, may be stored on the mobile device 400 in a volatile and non-persistent store such as the RAM 426. Such information may instead be stored in the non-volatile memory 424, for example, when storage intervals are relatively short, such that the information is removed from memory soon after it is stored. However, in one embodiment, this information is stored in the RAM 426 or another volatile and non-persistent store to ensure that the information is erased from memory when the mobile device 400 loses power. This prevents an unauthorized party from obtaining any stored decoded or partially decoded information by removing a memory chip from the mobile device 400, for example.

The mobile device 400 may be manually synchronized with a host system by placing the device 400 in an interface cradle, which couples the serial port 430 of the mobile device 400 to the serial port of a computer system or device. The serial port 430 may also be used to enable a user to set preferences through an external device or software application, or to download other application modules 424N for installation. This wired download path may be used to load an encryption key onto the device, which is a more secure method than exchanging encryption information via the wireless network 419.

A short-range communications subsystem 440 may also be included in the mobile device 400. The subsystem 440 may include an infrared device and associated circuits and components, or a short-range RF communication module such as a BLUETOOTH® module or an IEEE 802.11 module, for example, to provide for communication with similarly-enabled systems and devices.

The systems and methods disclosed herein are presented only by way of example and are not meant to limit the scope of the invention. Other variations of the systems and methods described above will be apparent to those skilled in the art and as such are considered to be within the scope of the invention. For example, it should be understood that acts and the order of the acts in the processing described herein may be altered, modified and/or augmented, or that said acts may be carried out by software and/or hardware modules designed for such purpose, and still achieve the desired outcome.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

Various embodiments of the present invention having been thus described in detail by way of example, it will be apparent to those skilled in the art that variations and modifications may be made without departing from the invention. The invention includes all such variations and modifications as fall within the scope of the appended claims.

We claim:

1. A system comprising:
   a first node being a first point of entry to a first network for a service request from a subscriber device, the first node having a published Internet Protocol (IP) address, the first node appearing to other networks to belong to an IP Multimedia Subsystem (IMS) network; and
   a second node external to the first network, the second node to provide routing of the service request to an application server, an identifier of the second node being included in a subscriber profile associated with a subscriber identity, the subscriber profile stored in a database that is accessible by the first node, the subscriber identity being included in a registration request of the subscriber device, the registration request configured to identify the first network as the home IMS network of the subscriber device; and
   a subscriber module that comprises the second node,
   wherein the subscriber device and the subscriber module both belong to a subscriber network.

2. The system as recited in claim 1, wherein the subscriber module is comprised in a messaging server.

3. The system as recited in claim 1, wherein the subscriber device is comprised in a wireless mobile communication device.

4. The system as recited in claim 1, wherein the database belongs to the first network.

5. The system as recited in claim 1, further comprising:
   a third node that belongs to the first network and is a proxy Session Initiation Protocol (SIP) server that routes registration requests.

6. The system as recited in claim 1, in which the registration request reaches the first node by way of a third node, wherein the third node is a proxy Session Initiation Protocol (SIP) server of a visited network.

7. The system as recited in claim 1, wherein the first node is comprised in an Interrogating Call Session Control Function (I-CSCF).

8. The system as recited in claim 1, wherein the second node is comprised in a Serving Call Session Control Function (S-CSCF).

9. The system as recited in claim 1, wherein the database is comprised in a Home Subscriber Server (HSS).

10. The system as recited in claim 1, wherein the subscriber module comprises the application server.

11. A method to assist in providing authenticated end-to-end communications, the method comprising:
    at a first node that is a first point of entry to a first network for a service request from a subscriber device, the first node having a published Internet Protocol (IP) address, the first node appearing to other networks to belong to an IP Multimedia Subsystem (IMS) network:
       receiving, from a second node, a registration request generated by the subscriber device;
       querying a database for a subscriber profile that is associated with a subscriber identity included in the registration request;
       resolving an identifier included in the subscriber profile, the identifier identifying a third node that is external to the first network and that provides routing of the service request to an application server; and
       routing the registration request from the first node to the third node according to the resolved identifier,
    wherein the second node is a proxy Session Initiation Protocol (SIP) server that routes registration requests; and
    wherein the subscriber device belongs to a subscriber domain and the third node is comprised in a subscriber module that belongs to the subscriber domain.

12. The method as recited in claim 11, wherein the subscriber module is comprised in a messaging server.

13. The method as recited in claim 11, wherein the subscriber device is comprised in a wireless mobile communication device.

14. The method as recited in claim 11, wherein the database belongs to the first network.

15. The method as recited in claim 11, wherein the second node belongs to the first network.

16. The method as recited in claim 11, wherein the second node belongs to an IMS domain to which the first node does not belong and to which the third node does not belong.

17. A method for providing authenticated end-to-end communications, the method comprising:
    at a first node belonging to a first network:
       receiving from a second node belonging to a second network a registration request generated by a subscriber device, the registration request including a subscriber identity; and
       handling the registration request,
    wherein the second node is a first point of entry to the second network for a service request from the subscriber device, and the first node provides routing of the service request to an application server; and
    wherein the subscriber device belongs to a subscriber domain and the first node is comprised in a subscriber module that belongs to the subscriber domain.

18. The method as recited in claim 17, wherein handling the registration request comprises:
    handling authentication of the subscriber device based, at least in part, on the subscriber identity.

19. The method as recited in claim 17, wherein the subscriber module is comprised in a messaging server.

20. The method as recited in claim 17, wherein the subscriber device is comprised in a wireless mobile communication device.

* * * * *

UNITED STATES PATENT AND TRADEMARK OFFICE
CERTIFICATE OF CORRECTION

| | | |
|---|---|---|
| PATENT NO. | : 8,279,798 B2 | Page 1 of 1 |
| APPLICATION NO. | : 11/972202 | |
| DATED | : October 2, 2012 | |
| INVENTOR(S) | : Preiss et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1045 days.

Signed and Sealed this
Twenty-third Day of September, 2014

Michelle K. Lee
*Deputy Director of the United States Patent and Trademark Office*